(12) United States Patent
Hattori et al.

(10) Patent No.: US 11,973,187 B2
(45) Date of Patent: Apr. 30, 2024

(54) LITHIUM POLYMER BATTERY

(71) Applicant: MURATA MANUFACTURING CO., LTD., Kyoto (JP)

(72) Inventors: Koji Hattori, Kyoto (JP); Shuichi Nagaoka, Kyoto (JP); Kenji Oshima, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 507 days.

(21) Appl. No.: 17/060,783

(22) Filed: Oct. 1, 2020

(65) Prior Publication Data

US 2021/0020987 A1 Jan. 21, 2021

Related U.S. Application Data

(63) Continuation of application No. PCT/JP2019/014093, filed on Mar. 29, 2019.

(30) Foreign Application Priority Data

Apr. 3, 2018 (JP) .................................. 2018-071748

(51) Int. Cl.
*H01M 10/0565* (2010.01)
*H01M 4/134* (2010.01)
(Continued)

(52) U.S. Cl.
CPC ....... *H01M 10/0565* (2013.01); *H01M 4/134* (2013.01); *H01M 50/46* (2021.01);
(Continued)

(58) Field of Classification Search
CPC . H01M 10/0565; H01M 50/45; H01M 50/105
See application file for complete search history.

(56) References Cited

U.S. PATENT DOCUMENTS

| 2003/0134190 A1 | 7/2003 | Ishida et al. |
| 2004/0041537 A1 | 3/2004 | Ishida et al. |

(Continued)

FOREIGN PATENT DOCUMENTS

| JP | H11219725 | 8/1999 |
| JP | H11283672 A | 10/1999 |

(Continued)

OTHER PUBLICATIONS

Japanese Office Action dated Mar. 15, 2022 in corresponding Japanese Application No. 2020-512221.
(Continued)

*Primary Examiner* — Stephan J Essex
(74) *Attorney, Agent, or Firm* — K&L Gates LLP

(57) ABSTRACT

A lithium polymer battery is provided. The lithium polymer battery includes a laminate film as an exterior material including a metal foil. The lithium polymer battery further includes a first electrode including the metal foil and a first electrode active material layer provided on the metal foil; a second electrode including a second electrode current collector and a second electrode active material layer provided on the second electrode current collector, and a polymer electrolyte provided at an interface between the metal foil 11 and the first electrode active material layer.

16 Claims, 4 Drawing Sheets

(51) Int. Cl.
*H01M 50/105* (2021.01)
*H01M 50/46* (2021.01)
*H01M 50/534* (2021.01)
*H01M 50/536* (2021.01)

(52) U.S. Cl.
CPC ........ *H01M 50/105* (2021.01); *H01M 50/534* (2021.01); *H01M 50/536* (2021.01)

(56) References Cited

U.S. PATENT DOCUMENTS

| | | | |
|---|---|---|---|
| 2005/0191545 A1* | 9/2005 | Bowles | H01M 4/5835 429/231.95 |
| 2011/0293976 A1 | 12/2011 | Chiba et al. | |
| 2013/0029205 A1 | 1/2013 | Adams et al. | |
| 2016/0322685 A1* | 11/2016 | Choi | H01M 10/045 |

FOREIGN PATENT DOCUMENTS

| | | |
|---|---|---|
| JP | 2000067850 A | 3/2000 |
| JP | 2002203524 A | 7/2002 |
| JP | 2002260739 A | 9/2002 |
| JP | 2002260740 A | 9/2002 |
| JP | 2003229100 A | 8/2003 |
| JP | 2016006786 A | 1/2016 |
| JP | 2016028386 A | 2/2016 |
| WO | WO-2010106412 A1 * 9/2010 ........ H01M 10/0525 |

OTHER PUBLICATIONS

International Search Report for Application No. PCT/JP2019/014093, dated Jun. 25, 2019.
Japanese Office Action dated Oct. 4, 2022 in corresponding Japanese Application No. 2020-512221.
Japanese Office Action dated Aug. 31, 2021 in corresponding Japanese Application No. 2020-512221.

* cited by examiner

LITHIUM POLYMER BATTERY

CROSS REFERENCE TO RELATED APPLICATIONS

The present application is a continuation of PCT patent application no. PCT/JP2019/014093, filed on Mar. 29, 2019, which claims priority to Japanese patent application no. JP2018-071748 filed on Apr. 3, 2018, the entire contents of which are being incorporated herein by reference.

BACKGROUND

The present technology generally relates to a lithium polymer battery.

Secondary batteries have been used as a power source for various electronic devices. A secondary battery has a structure in which a positive electrode, a negative electrode, a separator disposed between the positive electrode and the negative electrode, and an electrolyte are enclosed in an exterior package. In particular, in a lithium ion secondary battery, lithium ions move between the positive electrode and the negative electrode through the electrolyte so that the battery is charged and discharged.

In recent years, a high-capacity (high-energy-density) lithium ion secondary battery that is very thin and has flexible characteristics has been demanded for wearable devices and card type devices. In addition, an exterior material (pouch) made of a laminate film including a resin layer on both surfaces of a metal foil is widely used as an exterior package for smartphones and tablet terminals. In order to realize a thinner, higher-energy-density lithium ion secondary battery, many researches have been done to reduce the thickness of the metal foil and the resin layer as much as possible.

SUMMARY

In a conventional lithium ion secondary battery, when a cell including, as an electrode current collector, a metal foil in a laminate film is bent, the battery is deactivated and the reliability of the battery is reduced. Specifically, for example, the laminate film making up the exterior material was wrinkled due to repeated bending. More specifically, the metal foil caused work hardening in the part of wrinkles that were formed due to bending of the lithium ion secondary battery so that pinholes were relatively easily formed, and the battery was deactivated due to the moisture in the outside air entering from the pinholes into the battery.

Although the laminate film has a nylon or PET (polyethylene terephthalate) layer as a protective layer on the outer side of the film, and a resin layer such as a polypropylene layer as an adhesive layer on the inner surface of the film, it has been difficult to sufficiently suppress the reduction in reliability due to work hardening of the metal foil in the wrinkled part that is formed by repeated bending.

An object of the present disclosure is to provide a lithium polymer battery that has higher reliability having a sufficiently high energy density.

The present disclosure provides a surprising technical solution that use of a polymer electrolyte as an electrolyte can exert an effect of suppressing a reduction in reliability due to work hardening of a metal foil.

According to an embodiment of the present technology, a lithium polymer battery is provided. The lithium polymer battery including:

a laminate film having a metal foil, the laminate film being as an exterior material;

a first electrode including the metal foil and a first electrode active material layer provided on the metal foil;

a second electrode including a second electrode current collector and a second electrode active material layer provided on the second electrode current collector, and a polymer electrolyte provided at an interface between the metal foil and the first electrode active material layer.

According to at least an embodiment of the present technology. The lithium polymer battery has higher reliability while having a sufficiently high energy density.

It should be understood that the effects described here are not necessarily limited, and may be any one of the effects described in the present disclosure or effects different therefrom.

DETAILED DESCRIPTION

Figure 1:
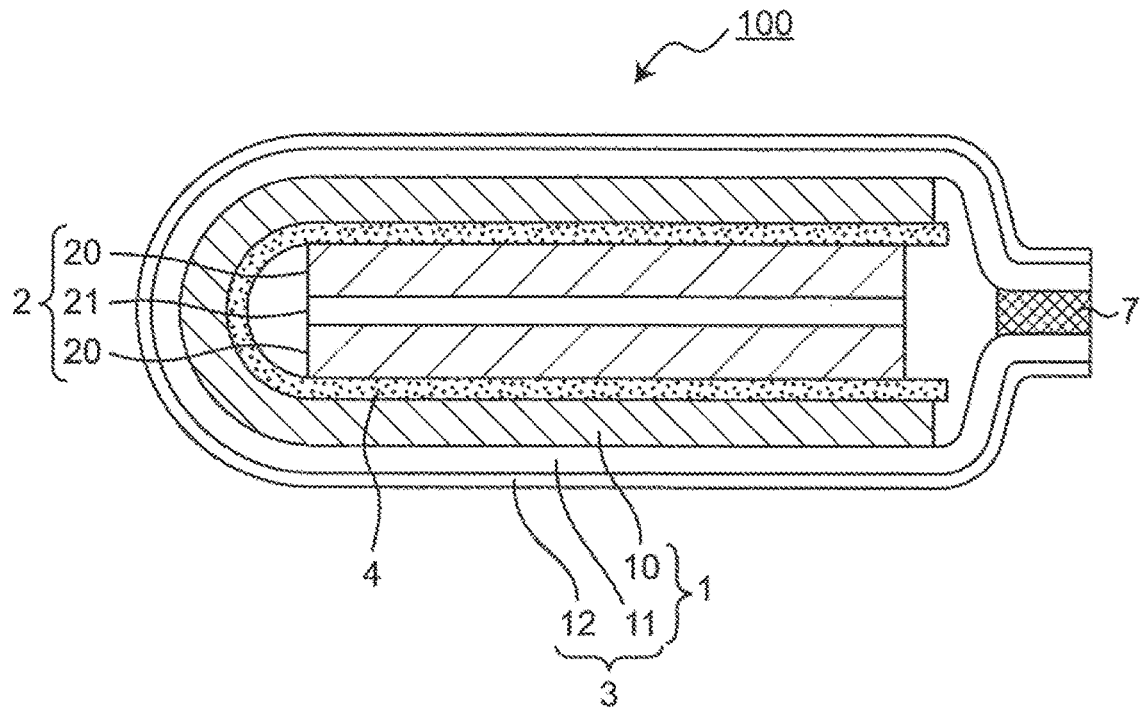
FIG. 1 is a schematic cross-sectional view of a lithium polymer battery according to an embodiment of the present technology.

As described herein, the present disclosure will be described based on examples with reference to the drawings, but the present disclosure is not to be considered limited to the examples, and various numerical values and materials in the examples are considered by way of example.

The present disclosure provides a lithium polymer battery. Herein, the term "lithium polymer battery" refers to, among those generally called a "lithium ion secondary battery", a battery including, as an electrolyte, a polymer electrolyte instead of a liquid electrolyte.

Hereinafter, the lithium polymer battery of the present disclosure will be described in detail with reference to the drawings showing some embodiments. Herein, various elements in the drawings are merely schematically shown as examples for the understanding of the present disclosure, and appearances and dimensional ratios of the elements may be different from actual ones. Unless otherwise specified, the "vertical direction", "horizontal direction", and "front and back direction" used directly or indirectly herein correspond to the "vertical direction", "horizontal direction", and "front and back direction" in the drawings, respectively. Unless otherwise specified, the same reference signs or symbols indicate the same members or the same meanings except for the difference in the shape.

As shown in, for example, FIGS. 1 to 4, a secondary battery 100 of the present disclosure includes an exterior material that is made of a laminate film 3 and that encloses a polymer electrolyte (not shown), and includes a first electrode 1 and a second electrode 2. The secondary battery 100 of the present disclosure usually further includes a separator 4 between the first electrode 1 and the second electrode 2. The first electrode is one of the so-called positive and negative electrodes, and the second electrode is the other one of the electrodes. From the viewpoint of further improving the energy density and reliability, the first electrode is preferably the negative electrode, and the second electrode is preferably the positive electrode. FIGS. 1 to 4 are schematic cross-sectional views of the lithium polymer battery according to first to fourth embodiments of the present disclosure, respectively.

The exterior material is usually a flexible pouch (soft bag) Those outer peripheral edge in planar view is sealed by heat sealing, and therefore, the secondary battery of the present disclosure is also called a "flexible secondary battery". The planar view is a state of a subject (for example, the exterior material or the secondary battery) that is placed and viewed from directly above in the thickness (height) direction of the subject, and is synonymous with the plan view. The subject (for example, the exterior material or the secondary battery) is placed so that a plane (flat surface) having the maximum area among the planes that form the outer shape of the subject may serve as the bottom surface.

The laminate film 3 making up the exterior material includes a metal foil 11, and usually includes at least one resin layer 12 on an outer side of the exterior material. Specifically, the laminate film 3 includes at least one resin layer 12 on a surface of the metal foil 11 reverse to a first electrode active material layer 10-formed surface of the metal foil 11 (the surface is preferably the entire reverse surface). The laminate film 3 making up the exterior material generally includes at least one resin layer 12 on the outer side of the exterior material in the metal foil 11 for the purpose of deep drawing processing or surface printing.

The metal foil 11 prevents the permeation of moisture and gases and functions as a current collector of the first electrode 1. The metal foil 11 is not particularly limited as long as it is a metal foil capable of acting as described above, and examples thereof include a copper foil, an aluminum foil, a stainless steel foil, a nickel foil, and a nickel-plated metal foil. The nickel-plated metal foil is a metal foil having a nickel-plated layer, and the metal coated with the nickel-plated layer may be aluminum, copper, stainless steel, or iron. From the viewpoint of further improving the reliability, the metal foil 11 is preferably made of a material that does not cause a side reaction such as dissolution at the potential of the electrode, and it is more preferable that the metal foil 11 be an aluminum foil or a stainless steel foil when the first electrode is a positive electrode, and a copper foil, a stainless steel foil, a nickel foil, or a nickel-plated metal foil when the first electrode is a negative electrode.

The thickness of the metal foil 11 is not particularly limited, and is preferably 10 μm or more and 50 μm or less, and more preferably 10 μm or more and 20 μm or less from the viewpoint of further improving the energy density and reliability.

The metal foil 11 makes up the first electrode 1 together with the first electrode active material layer 10 directly formed on the metal foil 11. The first electrode active material layer 10 refers to a positive electrode active material layer described later when the first electrode 1 is a positive electrode, and refers to a negative electrode active material layer described later when the first electrode 1 is a negative electrode.

Figure 5:
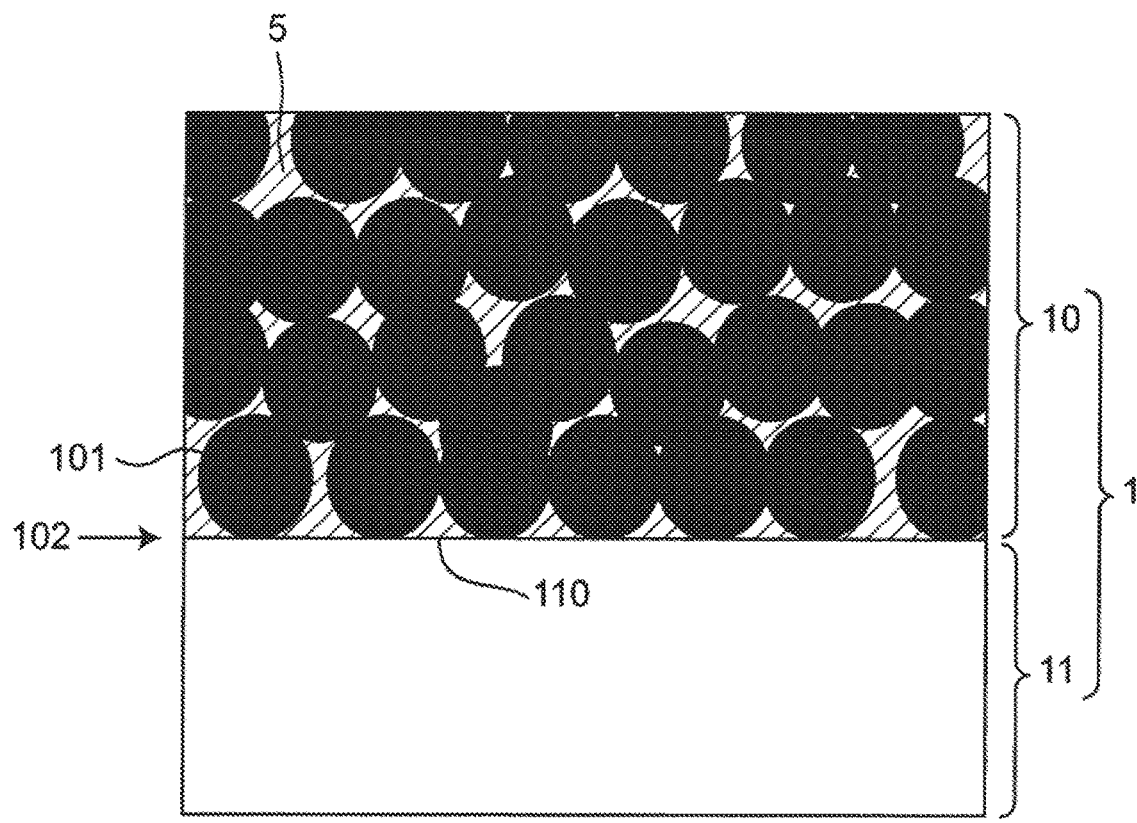
FIG. 5 is an enlarged schematic cross-sectional view showing an interface between a metal foil in a laminate film making up an exterior material and an electrode active material layer (for example, a negative electrode active material layer) in the lithium polymer battery according to an embodiment of the present technology.

In the present disclosure, the polymer electrolyte is present at an interface 102 between the metal foil 11 and the first electrode active material layer 10. The wording "the polymer electrolyte is present at the interface 102 between the metal foil 11 and the first electrode active material layer 10" means a state as shown in FIG. 5 in which a polymer electrolyte 5 (shown by hatching) is present between particles 101 making up the first electrode active material layer 10 and reaches a first electrode active material layer-formed surface 110 of the metal foil 11. The degree of presence of the polymer electrolyte 5 at the interface 102 between the metal foil 11 and the first electrode active material layer 10 (specifically, the degree at which the polymer electrolyte 5 reaches the first electrode active material layer-formed surface 110) is not particularly limited as long as the formation of pinholes is effectively suppressed and the reliability is improved, and it is only required that a large part of the first electrode active material layer-formed surface 110 be in contact with the polymer electrolyte 5. FIG. 5 is a partially enlarged schematic cross-sectional view showing the interface between the metal foil in the laminate film making up the exterior material and the electrode active material layer (for example, a negative electrode active material layer) in the lithium polymer battery according to one embodiment of the present disclosure.

When the polymer electrolyte is present at the interface 102 between the metal foil 11 and the first electrode active material layer 10, the polymer of the polymer electrolyte assists and reinforces the metal foil. Therefore, when the metal foil is bent, the bent portion is rounded with curvature and bent smoothly (gradually). Such bent portion is thought to result in the prevention of formation of pinholes and improvement of the reliability. If the metal foil is bent without the presence of the polymer electrolyte at the interface 102 between the metal foil 11 and the first electrode active material layer 10, the bent portion cannot be smoothly bent with curvature and forms an acute angle. Therefore, it is thought that pinholes are likely to be formed and the reliability is reduced. When the polymer electrolyte used is an electrolyte obtained using a polymer produced in advance by polymerization of monomers, the polymer electrolyte is incapable of being sufficiently present at the interface between the metal foil and the first electrode active material layer even if the polymer electrolyte is heated for impregnation into the electrode active material layer.

From the viewpoint of further improving the reliability, it is preferable that the interface 102 between the metal foil 11 and the first electrode active material layer 10 be filled with the polymer electrolyte 5 without a void. The wording "the interface 102 between the metal foil 11 and the first electrode active material layer 10 is filled with the polymer electrolyte 5 without a void" does not necessarily mean that the interface 102 has absolutely no voids, and it is only required that substantially no voids be present as long as further improvement of the reliability is achieved.

Specifically, for example, the first electrode 1 is taken out of the secondary battery and frozen, and the interface between the metal foil 11 and the first electrode active material layer 10 is photographed with a microscope in 100 random visual fields. It is required that consequently 95% or more, preferably 99% or more, and more preferably 100% of the interface 102 be covered with a solid component derived from the polymer electrolyte.

More specifically, it is preferable that the secondary battery have a cell voltage retention rate before and after a bending test described later of 60% or more, preferably 80% or more, and more preferably 95% or more, the bending test being a test in which an operation of winding the secondary battery around a cylindrical pipe having a curvature diameter of 50 mm, and then stretching the secondary battery is repeated 1000 times. The cell voltage after the bending test is the voltage of the cell after being left in a normal temperature and normal humidity room for another 2 weeks after the test.

The resin layer 12 is a polymer layer and is not particularly limited, but a polyester (for example, polyethylene terephthalate) for printability and/or a polyamide (nylon) for deep drawing processing is generally used.

The thickness of the resin layer 2 is not particularly limited, and is preferably 5 μm or more and 100 μm or less, and more preferably 10 μm or more and 50 μm or less from the viewpoint of further improving the energy density and reliability.

Figure 2:
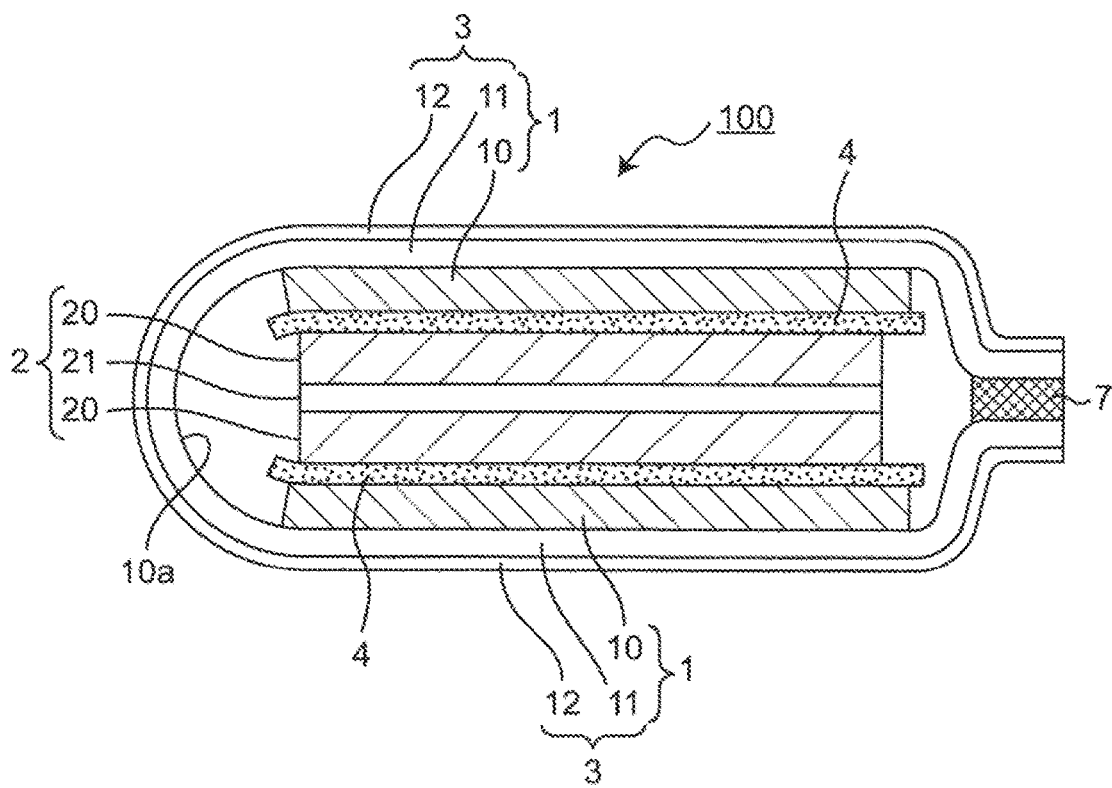
FIG. 2 is a schematic cross-sectional view of the lithium polymer battery according to an embodiment of the present technology.
Figure 3:
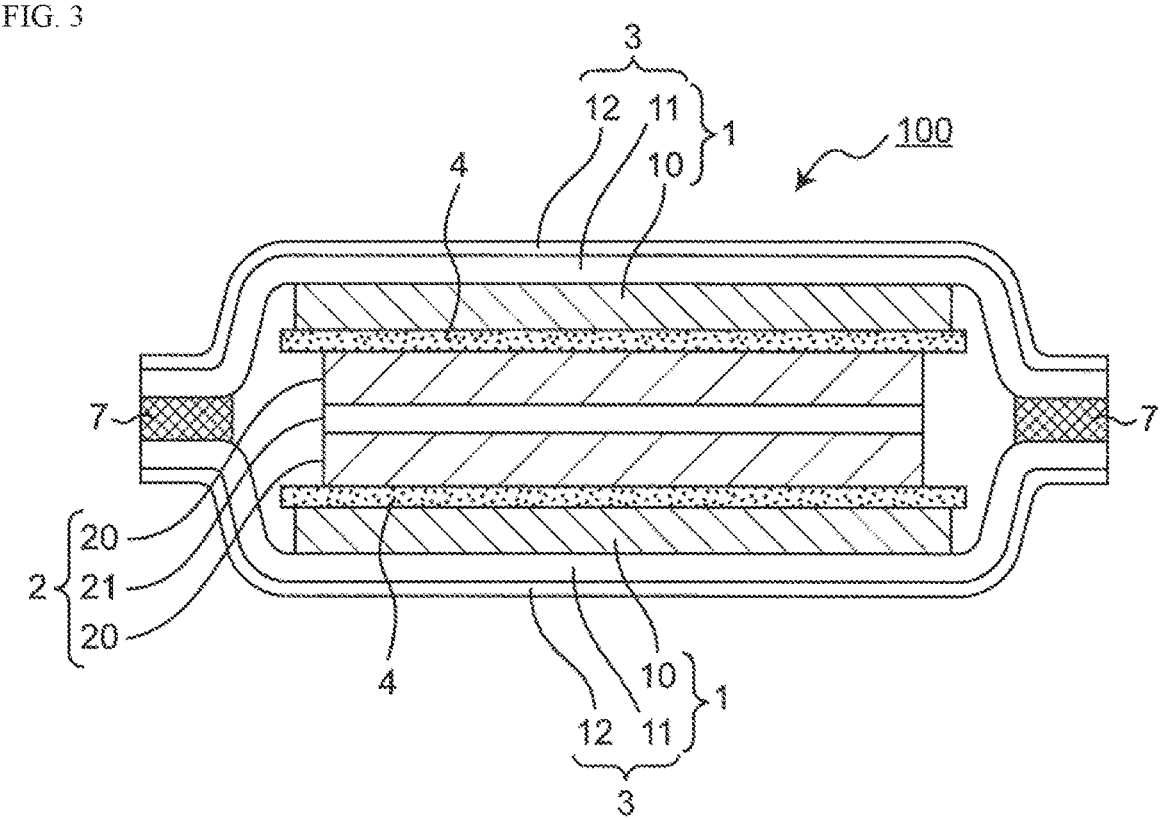
FIG. 3 is a schematic cross-sectional view of the lithium polymer battery according to an embodiment of the present technology.

The second electrode 2 includes a second electrode current collector 21 and a second electrode active material layer 20 formed on the second electrode current collector 10. The second electrode current collector 21 refers to a positive electrode current collector described later when the second electrode 2 is a positive electrode, and refers to a negative electrode current collector described later when the second electrode 2 is a negative electrode. The second electrode active material layer 20 refers to a positive electrode active material layer described later when the second electrode 2 is a positive electrode, and refers to a negative electrode active material layer described later when the second electrode 2 is a negative electrode. In FIGS. 1 to 3, the second electrode 2 has the second electrode active material layer 20 on both surfaces of the second electrode current collector 21, but the second electrode 2 may have the second electrode active material layer 20 on one surface of the second electrode current collector 21. From the viewpoint of further improving the energy density, the second electrode 2 preferably includes the second electrode active material layer 20 on both surfaces of the second electrode current collector 21.

In the present disclosure, the thickness of the lithium polymer battery 100 is usually 1 mm or less, and from the viewpoint of further improving the energy density, a battery having a thickness of 0.5 mm or less is particularly effective as compared with a conventional lithium polymer battery. The lower limit of the thickness of the lithium polymer battery is not particularly limited, and the smaller the thickness is, the more effective the battery is for the high energy density. However, in order to provide a practical capacity, the thickness is preferably 0.15 mm or more, particularly preferably 0.25 mm or more, and further preferably 0.40 mm or more.

The total thickness of the first electrode active material layer 10, the separator 4, and the second electrode active material layer 20 that are continuously arranged is usually 50 μm or more, and from the viewpoint of further improving the energy density, the total thickness is preferably 100 μm or more, and more preferably 150 μm or more. The upper limit of the thickness is not particularly limited, and the thickness is usually 200 μm or less, and in particular, 180 μm or less. The wording "the first electrode active material layer 10, the separator 4, and the second electrode active material layer 20 that are continuously arranged" means "the first electrode active material layer 10, the separator 4, and the second electrode active material layer 20 that are continuously arranged in the thickness direction", and corresponds to "thickness of a polymer-filled layer" described later. As for the total thickness, it is required that the average of thicknesses at 100 random positions be within the above-mentioned range.

The polymer electrolyte contains a polymer and a non-aqueous electrolyte. The polymer electrolyte has a gel-like morphology. The gel-like state is a state in which a polymer-based support structure is maintained throughout the system, but the fluidity due to a liquid substance such as a solvent is lost and the viscosity is exhibited.

The polymer is not particularly limited as long as it can be obtained by polymerizing the monomer making up the polymer in the presence of a non-aqueous electrolyte, and examples thereof include an acrylic polymer. Specific examples of the acrylic polymer include polymers containing, as a monomer component, at least one monomer selected from the following groups consisting of acrylic monomers:

monofunctional monomers: acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, and allyl acrylate;

bifunctional monomers: diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylate, and polyalkylene glycol dimethacrylate;

trifunctional monomers: trimethylolpropane alkoxylate triacrylate and pentaerythritol alkoxylate triacrylate; and tetrafunctional monomers: pentaerythritol alkoxylate tetraacrylate and ditrimethylolpropane alkoxylate tetraacrylate.

From the viewpoint of further improving the reliability, it is preferable that the polymer contain, as a monomer component, at least one monomer selected from the groups consisting of bifunctional monomers and trifunctional monomers.

The content rate of the polymer based on the total amount of the polymer electrolyte is usually 0.1 wt % or more and 30 wt % or less, and from the viewpoint of further improving the energy density and reliability, the content rate is preferably 3 wt % or more and 10 wt % or less. It is required that the total content rate of the monomers at the time of production be within the above-mentioned range based on the total amount of the electrolyte.

The non-aqueous electrolyte assists the movement of lithium ions. The non-aqueous electrolyte contains a non-aqueous solvent and an electrolyte salt. The non-aqueous solvent is not particularly limited as long as it does not react with the monomer that may make up the polymer during the polymerization of the monomer described later, and examples of the non-aqueous solvent include at least one solvent selected from the group consisting of carbonate solvents, ester solvents, sultone solvents, nitrile solvents and the like, and fluorinated compounds of the above-mentioned solvents. From the viewpoint of further improving the energy density and reliability, the non-aqueous electrolyte preferably contains a carbonate solvent as the non-aqueous solvent.

The carbonate solvent contains a cyclic carbonate and/or a chain carbonate, and from the viewpoint of further improving the energy density and reliability, the carbonate solvent preferably contains a cyclic carbonate and a chain carbonate. Examples of the cyclic carbonate include at least one carbonate selected from the group consisting of propylene carbonate (PC), ethylene carbonate (EC), fluoroethylene carbonate (FEC), butylene carbonate (BC), and vinylene carbonate (VC). Examples of the chain carbonate include at least one carbonate selected from the group consisting of dimethyl carbonate (DMC), diethyl carbonate (DEC), ethylmethyl carbonate (EMC), and dipropyl carbonate (DPC).

Examples of the ester solvent include at least one solvent selected from the group consisting of methyl formate, ethyl formate, propyl formate, methyl acetate, ethyl acetate, propyl acetate, methyl propionate, ethyl propionate, propyl propionate (PP), and methyl butyrate.

Examples of the sultone solvent include at least one solvent selected from the group consisting of propane sultone (PS) and propene sultone.

Examples of the nitrile solvent include at least one solvent selected from the group consisting of adiponitrile (ADN), succinonitrile, suberonitrile, acetonitrile, glutaronitrile, methoxyacetonitrile, and 3-methoxypropionitrile.

The electrolyte salt in the non-aqueous electrolyte is not particularly limited, and for example, a Li salt such as $LiPF_6$, $LiBF_4$, $LiClO_4$, $LiCF_3SO_3$, $Li(CF_3SO_2)_2N$, $Li(C_2F_5SO_2)_2N$, $Li(CF_3)_2N$, and $LiB(CN)_4$ is preferably used.

The concentration of the electrolyte salt in the non-aqueous electrolyte is not particularly limited, and may be, for example, 0.1 mol/L or more and 4 mol/L or less, and from the viewpoint of further improving the energy density and reliability, the concentration is preferably 0.5 mol/L or more and 2 mol/L or less.

In a lithium polymer battery 100 according to an embodiment shown in FIG. 1, the exterior material is made of one piece of laminate film 3 that is folded back. Therefore, in planar view, the exterior material has one side having a folded structure of the one piece of laminate film 3. In planar view, the outer peripheral edge (peripheral part) of the exterior material other than the one side may be a seal part 7, for example. The one piece of laminate film 3 referred to here is one piece of laminate film including a metal foil 11, and a first electrode active material layer 10 is formed on the metal foil 11. The seal part 7 may be formed by heat sealing a resin layer (polymer layer) similar to the resin layer 12 described above. The resin (polymer) forming the seal part 7 may be selected independently from the resin (polymer) forming the resin layer 12

In the present embodiment, the first electrode active material layer 10 is continuously formed on the metal foil 11 in the one piece of laminate film 3. As shown in FIG. 1, such one piece of laminate film 3 is folded back with the first electrode active material layer-formed surface being placed inside. As a result, the first electrode 1 including the first electrode active material layer 10 that is folded back sandwiches a second electrode 2 with a separator 4 interposed between the first electrode I and the second electrode 2. Although no tab is shown in FIG. 1, usually, a tab is connected to a second electrode current collector 21 of the second electrode 2 via a lead wire or without a lead wire, and is led to the outside.

A lithium polymer battery 100 according to another embodiment shown in FIG. 2 is similar to the secondary battery 100 according to the embodiment as described above except that a first electrode active material layer 10 is divided into two layers and formed on a metal foil 11 in one piece of laminate film 3.

In the present embodiment, as shown in FIG. 2, the one piece of laminate film 3, in which the first electrode active material layer 10 is divided into two layers, that is, a one first electrode active material layer and a different first electrode active material layer and formed on the metal foil 11, is folded back with the first electrode active material layer-formed surface being placed inside. As a result, one first electrode 1 including the one first electrode active material layer 10 and a different first electrode 1 including the different first electrode active material layer 10 sandwich a second electrode 2 with separators 4 interposed between the one and different first electrodes 1 and the second electrode 2. Although no tab is shown in FIG. 2, usually, a tab is connected to a second electrode current collector 21 of the second electrode 2 via a lead wire or without a lead wire, and is led to the outside similarly to the case of FIG. 1.

As shown in FIG. 2, the lithium polymer battery 100 of the present embodiment has a region 10a in which the metal foil 10 is exposed inside the folded-back part of the one piece of laminate film 3. From the viewpoint of further improving the reliability, it is preferable that the inside of the folded-back part of the one piece of laminate film 3 be filled with the polymer electrolyte. This is because the presence of the polymer of the polymer electrolyte on the surface of the metal foil 11 at the folded-back part provides an effect of assisting and reinforcing the metal foil 11.

In the lithium polymer battery 100 of the present embodiment, the inside of the folded-back part of the one piece of laminate film 3 may be filled with the separators 4, and the separators 4 filled in the folded-back part may be impregnated with and filed with the polymer electrolyte. This is because an effect of assisting and reinforcing the metal foil 11 is provided and weight reduction is achieved.

In a lithium polymer battery 100 according to another embodiment shown in FIG. 3, the exterior material is made of two pieces of laminate films 3 independent from each other. Therefore, in planar view, the exterior material has no one side having a folded structure of the laminate film 3. In planar view, all the outer peripheral edge of the exterior material may be seal parts 7, for example. Each of the two pieces of laminate films 3 referred to here is a laminate film including a metal foil 11, and a first electrode active material layer 10 is formed on the metal foil 11. Each of the seal parts 7 is similar to the seal part 7 in the embodiment as described above.

In the present embodiment, the first electrode active material layers 10 are respectively formed on the metal foils 11 in the two pieces of laminate films 3. As shown in FIG. 3, such two pieces of laminate films 3 are arranged with the first electrode active material layer-formed surfaces being placed inside. As a result, one first electrode 1 including one of the first electrode active material layers 10 in one of the laminate films 3 and a different first electrode 1 including the other one of the first electrode active material layers 10 in the other one of the laminate films 3 sandwich a second electrode 2 with separators 4 interposed between the one and different first electrodes 1 and the second electrode 2. Although no tab is shown in FIG. 3, usually, a tab is connected to a second electrode current collector 21 of the second electrode 2 via a lead wire or without a lead wire, and is led to the outside similarly to the case of FIG. 1.

Figure 4:
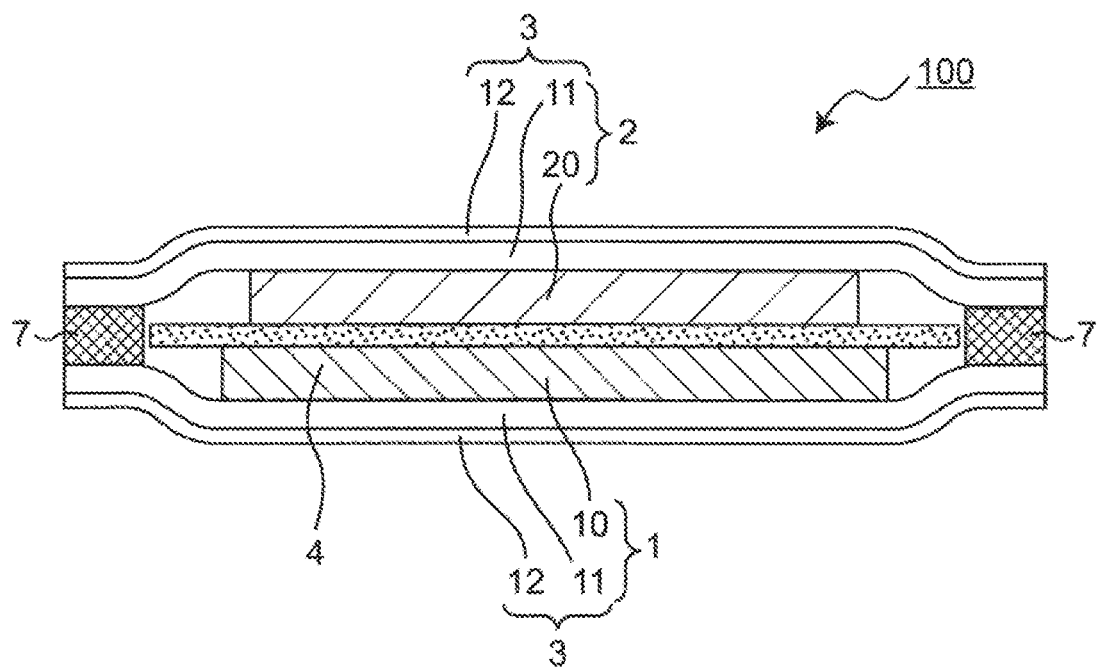
FIG. 4 is a schematic cross-sectional view of the lithium polymer battery according to an embodiment of the present technology.

In a lithium polymer battery 100 according to another embodiment shown in FIG. 4, a first electrode active material layer 10 is formed on a metal foil 11 in a lower laminate film 3, and a second electrode active material layer 20 is formed on a metal foil 11 in an upper laminate film 3.

The secondary battery of the present disclosure can be produced by the following method according to an embodiment of the present disclosure.

First, as shown in FIGS. 1 to 4, in an exterior material that is made of a laminate film 3 including a metal foil 11, and that has a first electrode 1 including the metal foil 11 and a first electrode active material layer 10 formed on the metal foil 11, a second electrode 2 including a second electrode current collector 21 and a second electrode active material layer 20 formed on the second electrode current collector 21; and a monomer electrolyte (not shown) containing a monomer are enclosed. Usually, a separator 4 is also enclosed in the exterior material. As described above, a tab may be led to the outside from the second electrode 2. It is not always necessary to lead a tab to the outside from the first electrode 1. Electrical conduction between the first electrode 1 and the outside can be achieved by scraping off an end of a resin layer 12 on the outer surface of a secondary battery 100.

The exterior material can be obtained by folding back or stacking one or two laminate films 3 as shown in, for example, FIGS. 1 to 4 and heat-sealing a predetermined outer peripheral edge (peripheral part).

The monomer electrolyte is a raw material mixture capable of providing the polymer electrolyte by polymerization of a monomer, and the monomer electrolyte contains a monomer capable of forming the polymer of the polymer electrolyte and a non-aqueous electrolyte, and may further contain a polymerization initiator.

Examples of the monomer include the acrylic monomers described above.

The polymerization initiator is a compound capable of initiating polymerization by heat, ultraviolet rays, electron beams or the like. Examples of the polymerization initiator include benzoin; benzil; acetophenone; benzophenone; Michler's ketone; biacetyl; benzoylperoxide; peroxyneodecanoates such as t-butyl peroxyneodecanoate, α-cumyl peroxyneodecanoate, t-hexyl peroxyneodecanoate, 1-cyclohexyl-1-methylethyl peroxyneodecanoate, and t-amyl peroxyneodecanoate; and peroxyneoheptanoates such as t-butyl peroxyneoheptanoate, α-cumyl peroxyneoheptanoate, t-hexyl peroxyneoheptanoate, 1-cyclohexyl-1-methylethyl peroxyneoheptanoate, and t-amyl peroxyheptanoate.

In the present disclosure, a secondary battery precursor obtained by enclosing the second electrode 2, the monomer electrolyte, the separator and the like in the exterior material is subjected to polymerization of the monomer to give a polymer electrolyte in the precursor. Specifically, application of the polymer electrolyte to the electrode active material layer or the like is not performed, and the monomer electrolyte after being filled in the exterior material is polymerized into a polymer. Since a polymer electrolyte has a relatively high viscosity and is not sufficiently impregnated and filled in the electrode active material layer, the polymer electrolyte cannot reach an interface 102 between the metal foil 11 and the first electrode active material layer 10, and cannot be present at the interface. Meanwhile, in the present disclosure, since the monomer electrolyte has a relatively low viscosity and is sufficiently impregnated and filled in the electrode active material layer, the polymer electrolyte reaches the interface 102 between the metal foil 11 and the first electrode active material layer 10 relatively easily, and the polymer electrolyte comes to be present at the interface by the polymerization. As a result, the reliability is improved. Preferably, the interface 102 between the metal foil 11 and the first electrode active material layer 10 is relatively easily filled with a polymer electrolyte 5 without a void, and the reliability is further improved. More preferably, the polymer electrolyte filled in the void part from the first electrode active material layer to the second electrode active material layer is continuously connected and integrated. Specifically, the polymer electrolyte is filled in the void part (void part on the assumption of the absence of the polymer electrolyte) from the first electrode active material layer to the second electrode active material layer, and the polymer electrolyte filled in the void part is continuously connected and integrated.

By the way, in order to realize a thinner secondary battery, it is effective to use, as the metal foil 11, a stainless steel foil having higher strength than that of an aluminum foil. Since the stainless steel foil has high strength, the polymer-filled layer needs to have a thickness commensurate with the strength and thickness of the metal foil. The polymer-filled layer refers to the first electrode active material layer, the separator, and the second electrode active material layer, which are filled with the polymer electrolyte and continuously arranged in the thickness direction. In other words, the polymer-filled layer is a polymer layer that is continuously integrated without being divided in the thickness direction by the presence of a current collector. In the present disclosure, the monomer electrolyte after being impregnated and filled in the polymer-filled layer is polymerized in the secondary battery, so that the monomer electrolyte, which is impregnated and filled in the first electrode active material layer, the separator, and the second electrode active material layer that are continuously arranged in the thickness direction, is polymerized into a polymer electrolyte and integrated. Specifically, the polymer electrolyte filled in the first electrode active material layer, the separator, and the second electrode active material layer that are continuously arranged is integrated. In other words, a polymer-impregnated layer is continuously formed in these adjacent layers. Therefore, the polymer-filled layer formed by filling these layers with the polymer electrolyte is thicker than a polypropylene layer or the like that is present as an inner resin layer of a laminate film in a conventional secondary battery. Therefore, the secondary battery can be bent more flexibly. In particular, a bent portion of the exterior material is likely to have a gap, but a gap is hardly formed in the secondary battery of the present disclosure since the monomer electrolyte is used. It is thought that such integration and thickening of the polymer-filled layer also contribute to the improvement of the reliability.

The monomer is polymerized by heating, irradiation with ultraviolet rays, irradiation with electron beams, or the like. Considering that the monomer is polymerized in the exterior material, it is preferable to perform the polymerization by heating.

After the polymerization of the monomer, an initial charging step is usually performed. Further, an aging step may be performed.

The initial charging step is the first charging step performed for the purpose of forming a solid electrolyte interface film (hereinafter referred to as an "SEI film") on the negative electrode surface, and is also called a chemical conversion step. The SEI film is formed by reductive decomposition of the additive contained in the electrolyte on the negative electrode surface in this step, and prevents further decomposition of the additive on the negative electrode surface during use of the secondary battery.

In the initial charging step, it is only required that at least a single charge be performed. Normally, at least a single charge and discharge is performed. A single charge and discharge includes a single charge and a single discharge after the charge. When the charge and discharge is repeated twice or more, charge-discharge is repeated the number of times. The number of times of the charge and discharge in this step is usually 1 or more and 3 or less.

The charging method may be a constant current charging method, a constant voltage charging method, or a combination thereof. For example, a constant voltage charge and a constant voltage charge may be repeated during a single charge. The charge conditions are not particularly limited as long as the SEI film is formed. From the viewpoint of further improving the thickness uniformity of the SEI film, it is preferable to perform a constant current charge and then a constant voltage charge.

The discharging method may be a constant current discharging method, a constant voltage discharging method, or a combination thereof. The discharge conditions are not particularly limited as long as the SEI film is formed. From the viewpoint of further improving the thickness uniformity of the SEI film, it is preferable to perform a constant current discharge.

The aging step is a step of leaving the secondary battery after the initial charging step in an open circuit state to stabilize the SEI film. The aging step is also called an aging treatment step.

The positive electrode active material layer contains a positive electrode active material, and usually further contains a binder and a conductive additive. The positive electrode active material is usually formed of a particulate material, and the positive electrode active material layer contains a binder (also called a "binding agent") for adequate contact between particles and shape retention. Furthermore, it is preferable that the positive electrode active material layer contain a conductive additive in order to facilitate the electron transfer that promotes the battery reaction.

The positive electrode active material is a material that directly participates in the electron transfer in the secondary battery, and is a main positive electrode material that is responsible for charge and discharge, that is, a battery reaction. More specifically, ions are introduced into the electrolyte due to the "positive electrode active material contained in the positive electrode active material layer", and the ions move between the positive electrode and the negative electrode to transfer electrons, so that charge and discharge is performed. The positive electrode active material layer is a layer that is capable of storing and releasing, in particular, lithium ions. Lithium ions move between the positive electrode and the negative electrode through the electrolyte so that the battery is charged and discharged.

The positive electrode active material is not particularly limited as long as it contributes to storage and release of lithium ions, but it is preferable that the positive electrode active material contain a lithium-containing composite oxide from the viewpoint of further improving the energy density and reliability. The lithium-containing composite oxide is usually a lithium-transition metal composite oxide. The transition metal may be any transition metal (transition element), and examples thereof include first transition elements, second transition elements, and third transition elements. Preferable transition metals are the first transition elements.

From the viewpoint of further improving the energy density and reliability, the positive electrode active material is preferably a lithium-transition metal composite oxide that contains lithium and at least one transition metal selected from the group consisting of scandium, titanium, vanadium, chromium, manganese, iron, cobalt, nickel, copper, and zinc (in particular, the group consisting of cobalt, nickel, manganese, and iron). Specific examples of such a lithium-transition metal composite oxide include lithium cobalt oxide, lithium nickel oxide, lithium manganese oxide, lithium iron phosphate, and those in which part of the transition metal in these compounds is replaced with a different metal (in particular, doped with a different metal). Examples of the different metal (doped metal) include at least one metal selected from the group consisting of aluminum, magnesium, zirconium, nickel, manganese, and titanium. From the viewpoint of further improving the energy density and reliability, the positive electrode active material preferably contains lithium cobalt oxide.

From the viewpoint of further improving the energy density and reliability, it is more preferable that the positive electrode active material contain a lithium cobalt oxide compound as a main component. The "lithium cobalt oxide compound" encompasses pure lithium cobalt oxide represented by the chemical formula $LiCoO_2$, and doped lithium cobalt oxide in which part of cobalt in the lithium cobalt oxide is replaced with a different metal (in particular, doped with a different metal).

The positive electrode active material can be obtained as a commercially available product, or can be produced by a known method.

The binder that may be contained in the positive electrode active material layer is not particularly limited. Examples of the binder in the positive electrode active material layer include at least one binder selected from the group consisting of polyvinylidene fluoride (PVdF), a vinylidene fluoride-hexafluoropropylene copolymer, a vinylidene fluoride-tetrafluoroethylene copolymer, polytetrafluoroethylene, and the like. From the viewpoint of further improving the energy density and reliability, the binder in the positive electrode active material layer preferably contains polyvinylidene fluoride (PVdF).

The conductive additive that may be contained in the positive electrode active material layer is not particularly limited. Examples of the conductive additive in the positive electrode active material layer include at least one conductive additive selected from the group consisting of carbon blacks such as thermal black, furnace black, channel black, Ketjen black, and acetylene black; graphite; carbon fibers such as carbon nanotubes and vapor-grown carbon fibers; metal powders such as those of copper, nickel, aluminum, and silver; and polyphenylene derivatives and the like. From the viewpoint of further improving the energy density and reliability, the conductive additive in the positive electrode active material layer preferably contains carbon black (in particular, acetylene black).

The positive electrode active material layer can be obtained, for example, by applying, to a coating object, a positive electrode slurry, which is obtained by dispersing a positive electrode active material together with a binder and a conductive additive added as desired in a solvent, drying the positive electrode slurry, and compacting (rolling) the positive electrode slurry using a roll pressing machine or the like. The coating object may be the positive electrode current collector or the metal foil 11. The pressure applied during the compacting can be adjusted to control the density. The solvent of the positive electrode slurry is not particularly limited, and a solvent that dissolves the binder is usually used. Examples of the solvent of the positive electrode slurry include organic solvents such as N-methylpyrrolidone, toluene, tetrahydrofuran, cyclohexane, and methyl ethyl ketone, and water. The amount of the positive electrode slurry applied to one surface is required to be within a range in which the dried positive electrode slurry achieves the above-mentioned basis weight of the positive electrode active material layer. From the viewpoint of further improving the energy density and reliability, in a preferable aspect, the positive electrode active material and the binder in the positive electrode active material layer are a combination of a lithium cobalt oxide compound (in particular, lithium cobalt oxide) and polyvinylidene fluoride.

The positive electrode current collector is a member that contributes to collection and supply of electrons generated in the positive electrode active material by the battery reaction. Such a positive electrode current collector may be a sheet-shaped metal member, and may have a porous or perforated form when the positive electrode is enclosed in the negative electrode. The positive electrode current collector may be, for example, a metal foil, perforated metal, mesh, or expanded metal. The positive electrode current collector used in the positive electrode is preferably formed of a metal foil containing at least one metal selected from the group consisting of aluminum, stainless steel, nickel and the like, and may be, for example, a stainless steel foil.

The negative electrode active material layer contains a negative electrode active material, and usually further contains a binder and a conductive additive similarly to the positive electrode active material layer. The negative electrode active material is usually formed of a particulate material, and the negative electrode active material layer contains a binder (also called a "binding agent") for adequate contact between particles and shape retention. Furthermore, the negative electrode active material layer may contain a conductive additive in order to facilitate the electron transfer that promotes the battery reaction.

Similarly to the positive electrode active material contained in the positive electrode active material layer, the negative electrode active material contained in the negative electrode active material layer is a material that directly participates in the electron transfer in the secondary battery, and is a main negative electrode material that is responsible for charge and discharge, that is, a battery reaction. More specifically, ions are introduced into the electrolyte due to the "negative electrode active material contained in the negative electrode active material layer", and the ions move between the positive electrode and the negative electrode to transfer electrons, so that charge and discharge is performed. The negative electrode material layer is a layer that is capable of storing and releasing, in particular, lithium ions.

The negative electrode active material is not particularly limited as long as it contributes to storage and release of lithium ions, and is preferably a carbon material of various kinds, an oxide, a lithium alloy, silicon, a silicon alloy, or a tin alloy, for example.

Examples of the carbon material of various kinds for the negative electrode active material include graphite (for example, natural graphite, artificial graphite, MCMB (mesocarbon microbeads), non-graphitizable carbon, graphitizable carbon, surface-modified graphite, hard carbon, soft carbon, and diamond-like carbon. The surface-modified graphite is obtained by coating the surface of graphite with amorphous carbon in order to suppress any side reaction with the electrolyte. In particular, graphite is preferable because it has high electron conductivity and excellent adhesiveness to the negative electrode current collector.

From the viewpoint of further improving the energy density and reliability, it is more preferable that the negative electrode active material contain graphite (in particular, graphite coated with an amorphous layer) as a main component.

The binder that may be contained in the negative electrode active material layer is not particularly limited. Examples of the binder in the negative electrode active material layer include at least one binder selected from the group consisting of a styrene-butadiene rubber (SBR), polyacrylic acid, polyvinylidene fluoride (PVdF), a polyimide resin, and a polyamideimide resin. From the viewpoint of further improving the energy density and reliability, the binder in the negative electrode active material layer preferably contains PVdF.

The conductive additive that may be contained in the negative electrode active material layer is not particularly limited. Examples of the conductive additive in the negative electrode active material layer include at least one conductive additive selected from the group consisting of carbon blacks such as thermal black, furnace black, channel black, Ketjen black, and acetylene black; carbon fibers such as carbon nanotubes and vapor-grown carbon fibers; metal powders such as those of copper, nickel, and silver; and polyphenylene derivatives and the like.

The negative electrode active material layer can be obtained, for example, by applying, to a coating object, a negative electrode slurry, which is obtained by dispersing a negative electrode active material together with a binder, a conductive additive, and a thickener added as desired in a solvent, drying the negative electrode slurry, and compacting (rolling) the negative electrode slurry using a roll pressing machine or the like. The coating object may be the negative electrode current collector or the metal foil 11. The solvent of the negative electrode slurry is not particularly limited, and the same solvents as those mentioned as the solvent of the positive electrode slurry can be mentioned. From the viewpoint of further improving the energy density and reliability, in a preferable aspect, the negative electrode active material and the binder in the negative electrode active material layer are a combination of graphite (in particular, graphite coated with an amorphous layer) and PVdF.

The negative electrode current collector is a member that contributes to collection and supply of electrons generated in the negative electrode active material by the battery reaction. Such a current collector may be a sheet-shaped metal member. The metal foil in the laminate film may be used as the negative electrode current collector.

The separator is not particularly limited as long as it can allow ions to pass therethrough while preventing electrical contact between the positive electrode and the negative electrode. The material forming the separator is not particularly limited as long as it can prevent electrical contact between the positive electrode and the negative electrode, and examples thereof include an electrically insulating polymer. Examples of the electrically insulating polymer include polyolefins (for example, polyethylene and polypropylene), polyesters, polyimides, polyamides, polyamideimides, aramid, and cellulose. The separator is preferably a porous or microporous insulating member, and has a membrane form due to its small thickness. By way of example only, a polyolefin microporous membrane may be used as the separator.

The separator may be adhered to the positive electrode and/or the negative electrode. The adhesion is achieved by using an adhesive separator as the separator, applying an adhesive binder to the electrode active material layer (the positive electrode active mated al layer and/or the negative electrode active material layer, and/or thermocompression bonding. An adhesive agent may be used to impart adhesiveness or adhesive force to the separator or the electrode active material layer. The adhesive agent used may be polyvinylidene fluoride, an acrylic adhesive agent or the like. Further, filler particles such as alumina and silica may be used together with the adhesive agent.

The thickness of the separator is not particularly limited, and may be, for example, 20 μm or less, and in particular, 10 μm or less.

EXAMPLES

Example A1

Figure 6:
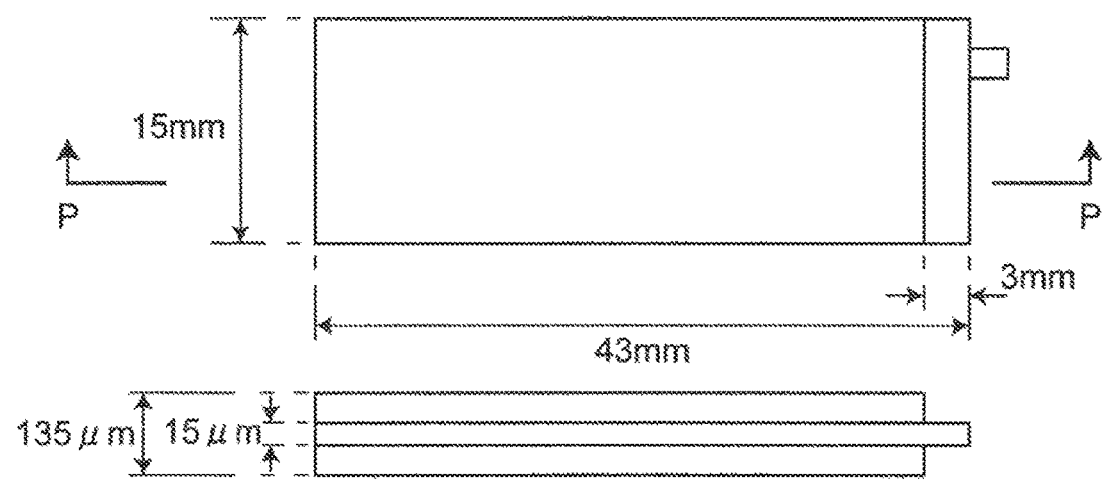
FIG. 6 includes an upper diagram that is a schematic top view of a positive electrode produced in the examples, and a lower diagram that is a schematic cross-sectional view taken along line P-P in the upper diagram according to an embodiment of the present technology.

Lithium cobalt oxide as a positive electrode active material, acetylene black as a conductive additive, and PVdF as a binder were mixed at a ratio of 90:5:5 (wt %), and an NMP solvent was further mixed to prepare a positive electrode active material-forming slurry. Then, the positive electrode active material-forming slurry was applied to both surfaces of a stainless steel foil having a thickness of 15 μm, dried, and subjected to roll press molding to form a positive electrode active material layer, whereby a positive electrode having a total thickness of 135 μm was produced. The obtained positive electrode was cut into a piece having a width of 15 mm and a length of 43 mm. Of the 43 mm-long positive electrode, the positive electrode active material layer was not applied to a 3 mm-wide region, and a nickel tab was welded to the portion. The positive electrode is shown in FIG. 6. FIG. 6 includes an upper diagram that is a schematic top view of the positive electrode, and a lower diagram that is a schematic cross-sectional view taken along line P-P in the upper diagram.

A negative electrode active material, that is, graphite whose surface was coated with an amorphous layer, and PVdF as a binding agent were mixed at a ratio of 90:10 (wt %), and an NMP solvent was further mixed to prepare a negative electrode active material-forming paste.

Figure 7:
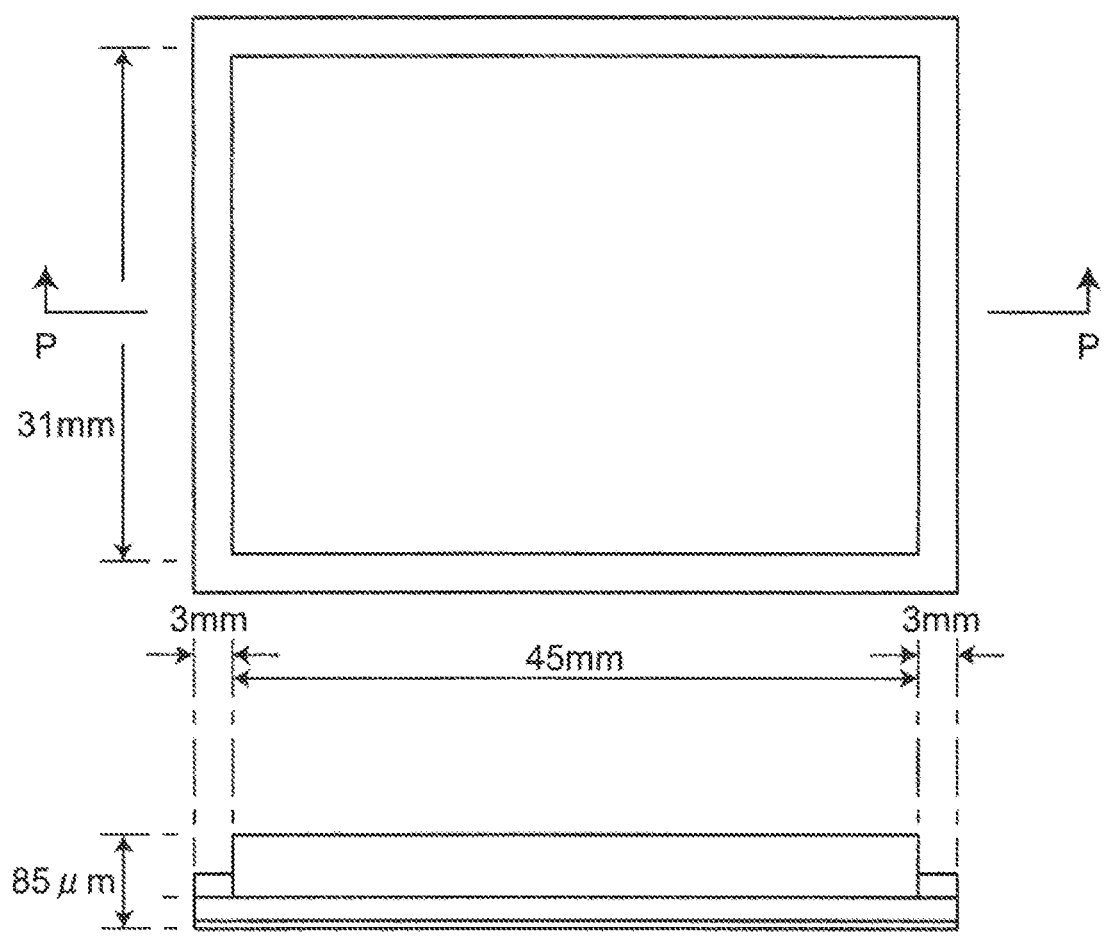
FIG. 7 includes an upper diagram that is a schematic top view of a negative electrode produced in the examples, and a lower diagram that is a schematic cross-sectional view taken along line P-P in the upper diagram according to an embodiment of the present technology.

In a stainless steel pouch film (three-layer structure (thickness)=PET layer (10 μm)/stainless steel layer (10 μm)/polypropylene layer (30 μm)), the polypropylene layer in a region having a width of 31 mm and a length of 45 mm was removed at a current collecting part (center part) with a polypropylene-fused part (peripheral part) having a width of 3 mm being left. In the stainless steel pouch film, the negative electrode active material-forming slurry was printed (applied by printing) on the center part from which the polypropylene had been removed, dried, and subjected to roll press molding to form a negative electrode active material layer, whereby a negative electrode having a total thickness of 85 μm was produced. The negative electrode is shown in FIG. 7. FIG. 7 includes an upper diagram that is a schematic top view of the negative electrode, and a lower diagram that is a schematic cross-sectional view taken along line P-P in the upper diagram.

An electrolyte was obtained by mixing and dissolving the following components.

| | |
|---|---|
| Acrylic monomer | 9.9 parts by weight |
| Carbonate solvent | 45 parts by weight |
| Ester solvent | 45 parts by weight |
| Electrolyte salt (LiPF$_6$) | 1.3 mol/L |
| Thermal polymerization initiator | 0.1 parts by weight |

The negative electrode was bent in half, the positive electrode was sandwiched in the negative electrode with a separator interposed therebetween, and two sides of the polypropylene portion left in the peripheral part of the stainless steel pouch film were thermally fused to produce a cell pouch. The separator used was a separator (20 μm-thick) including a nonwoven fabric made of aramid fibers and a coating layer made from alumina particles on the nonwoven fabric. The pouch was vacuum-dried at 120° C. overnight, and then an electrolyte containing a monomer and a polymerization initiator was injected in a glove box in an argon atmosphere. The remaining opening was thermally fused, and the product was taken out of the glove box to give a cell precursor. The cell precursor taken out of the glove box was heated to 90° C. to cause a thermal polymerization reaction. Then, an initial charging step was performed to give a cell shown in FIG. 1.

In the initial charging step, in a room temperature environment, a constant current charge was performed at 0.2 C until the voltage reached 4.2 V, and then a constant voltage charge was performed for 30 minutes at the voltage

Comparative Example A1

A cell was obtained in the same manner as in Example 1 except that the monomer and the polymerization initiator were not added to the electrolyte, and that the heating at 90° C. was not performed.

Comparative Example A2

A cell was obtained in the same manner as in Example 1 except that the following electrolyte was applied to the surfaces of the positive electrode, the negative electrode, and the separator in the glove box, and that an impregnation treatment was performed by heating at 90° C.

An electrolyte was obtained by mixing and dissolving the following components.

| | |
|---|---|
| PVdF | 9.9 parts by weight |
| Carbonate solvent | 45 parts by weight |
| Ester solvent | 45 parts by weight |
| Electrolyte salt (LiPF$_6$) | 1.3 mol/L |

Reference Example A1

(Non-Polymer Type)

A cell was obtained in the same manner as in Comparative Example A1 except that as an aluminum pouch film (three-layer structure (thickness)), a PET layer (10 μm)/aluminum layer (35 μm)/polypropylene layer (30 μm) film was used, that the polypropylene layer in the aluminum pouch film was not removed, and that two negative electrodes each including a copper foil as a negative electrode current collector and a negative electrode active material layer formed on one surface of the copper foil were used.

Examples B1 to B4

A cell was obtained in the same manner as in Example 1 except that the thicknesses of the layers and members were changed as shown in Table 1.

The energy density of each cell was calculated from the average voltage, capacity, and volume.

The "energy density" was evaluated according to the following criteria.

⊚: 250 Wh/L or more (excellent)
○: 230 Wh/L or more (good)
Δ: Less than 230 Wh/L (acceptable)

Each cell was subjected to the following bending test, and the cell voltages Va and Vb before and after the test were measured. After the test, the cell was left in a normal temperature and normal humidity (25° C., 50% RH) room for another 2 weeks, and then the cell voltage Vc was measured. The cell voltage retention rate is a value represented by "(Vc/Va)×100" (%).

An operation of winding each cell around a cylindrical pipe having a curvature diameter of 50 mm, and then stretching the cell was repeated 1000 times.

The "cell voltage retention rate" was evaluated according to the following criteria.

⊚: 95% or more (excellent)
○: 80% or more (good)
Δ: 60% or more (no problem in practical use (within acceptable range))
×: Less than 60% (problem in practical use)

<Coverage of Interface 102 Between Metal Foil 11 and First Electrode Active Material Layer 10 with Solid Component Derived from Polymer Electrolyte>

The first electrode 1 (negative electrode) was taken out of each cell, the sample was frozen, and the interface between the metal foil 11 and the first electrode active material layer (negative electrode active material layer) 10 was photographed with a microscope in 100 random visual fields (for example, FIG. 5). The coverage (average) of the interface 102 with the solid component derived from the polymer electrolyte was determined.

As for the evaluation results of the energy density and the cell voltage retention rate, poorer evaluation results were taken as the comprehensive evaluation results.

In Example A1, even when the cell was left for 2 weeks after the bending test, the voltage drop was slight, and no phenomenon of deterioration in performance was observed.

In Comparative Example A1, the voltage dropped immediately after the bending test, and when the cell was disassembled, the electrodes were displaced inside and contact between the positive and negative electrodes was observed.

Comparative Example A2 relates to a cell containing a conventional polymer electrolyte. No remarkable voltage drop was observed immediately after the bending test, but the voltage dropped after the cell was left for 2 weeks. Due to the absence of the polymer electrolyte at the interface between the foil of the poach (negative electrode) and the negative electrode active material layer, small pinholes were formed and the cell was deteriorated.

Reference Example A1 relates to a completely conventional cell. Since the resin layer (PP layer) on the inner surface of the pouch was not removed, no pinholes were formed. However, the energy density was lower because the cell was too thick.

The cells of Example A1 and Examples B1 to B4 had a satisfactory cell voltage retention rate while having a satisfactory energy density (Δ or better result in the comprehensive evaluation).

The cells of Example A1 and Examples B1 to B3 had a better cell voltage retention rate while having a better energy density (○ or better result in the comprehensive evaluation).

The cells of Example A1 and Examples B1 and B2 had an even better cell voltage retention rate while having an even better energy density (⊚ or better result in the comprehensive evaluation).

The cell of Example A1 had the best cell voltage retention rate while having the best energy density.

TABLE 1

| Thickness (μm) | | Example A1 | Comparative Example A1 | Comparative Example A2 | Reference Example A1 | Example B1 | Example B2 | Example B3 | Example B4 |
|---|---|---|---|---|---|---|---|---|---|
| Pouch | Outer resin layer | 10 | 10 | 10 | 10 | 10 | 10 | 10 | 10 |
| | Foil | 10 | 10 | 10 | 35 | 10 | 10 | 10 | 10 |
| | Inner resin layer | — | — | — | 30 | — | — | — | — |
| Negative electrode current collector | | Foil of pouch | Foil of pouch | Foil of pouch | 10 | Foil of pouch | Foil of pouch | Foil of pouch | Foil of pouch |
| Negative electrode active material layer | | 75 | 75 | 75 | 75 | 63 | 50 | 38 | 31 |
| Resin layer | | — | — | 5 | — | — | — | — | — |
| Separator | | 20 | 20 | 20 | 20 | 20 | 20 | 20 | 20 |
| Positive electrode active material layer | | 60 | 60 | 60 | 60 | 50 | 40 | 30 | 25 |
| Positive electrode current collector | | 15 | 15 | 15 | 15 | 15 | 15 | 15 | 15 |
| Positive electrode active material layer | | 60 | 60 | 60 | 60 | 50 | 40 | 30 | 25 |
| Separator | | 20 | 20 | 20 | 20 | 20 | 20 | 20 | 20 |
| Resin layer | | — | — | 5 | — | — | — | — | — |
| Negative electrode active material layer | | 75 | 75 | 75 | 75 | 63 | 50 | 38 | 31 |
| Negative electrode current collector | | Foil of pouch | Foil of pouch | Foil of pouch | 10 | Foil of pouch | Foil of pouch | Foil of pouch | Foil of pouch |
| Pouch | Inner resin layer | — | — | — | 30 | — | — | — | — |

TABLE 1-continued

| Thickness (μm) | Example A1 | Comparative Example A1 | Comparative Example A2 | Reference Example A1 | Example B1 | Example B2 | Example B3 | Example B4 |
|---|---|---|---|---|---|---|---|---|
| Foil | 10 | 10 | 10 | 10 | 10 | 10 | 10 | 10 |
| Outer resin layer | 10 | 10 | 10 | 35 | 10 | 10 | 10 | 10 |
| Total thickness of positive electrode | 135 | 135 | 135 | 135 | 115 | 95 | 75 | 65 |
| Total thickness of negative electrode | 85 | 85 | 85 | 85 | 73 | 60 | 48 | 41 |

The symbol "—" means "0".

TABLE 2

| | | Example A1 | Comparative Example A1 | Comparative Example A2 | Reference Example A1 | Example B1 | Example B2 | Example B3 | Example B4 |
|---|---|---|---|---|---|---|---|---|---|
| Cell thickness (mm) | | 0.36 | 0.36 | 0.37 | 0.52 | 0.31 | 0.27 | 0.22 | 0.20 |
| Capacity (mAh) | | 28 | 28 | 28 | 28 | 23 | 18 | 14 | 11 |
| Energy density (Wh/L) | | 295⊙ | 295⊙ | 287⊙ | 203▲ | 281⊙ | 263⊙ | 238○ | 221▲ |
| Thickness of polymer-filled layer (μm) | | 155 | — | — | — | 133 | 110 | 88 | 76 |
| Cell voltage (V) | Before test Va | 4.14 | 4.18 | 4.15 | 4.18 | 4.14 | 4.14 | 4.14 | 4.14 |
| | After test Vb | 4.14 | 1.4 | 4.14 | 4.16 | 4.14 | 4.13 | 4.12 | 4.13 |
| | After 2 weeks Vc | 4.04 | 0.17 | 2.37 | 3.98 | 4.04 | 4.01 | 3.99 | 2.54 |
| Cell voltage retention rate (%) | | 97.6⊙ | 4.1X | 57.1X | 95.2⊙ | 97.6⊙ | 96.9⊙ | 96.4⊙ | 61.4▲ |
| Coverage of interface | | 100% | — | 0% | — | 100% | 100% | 99% | 95% |
| Comprehensive evaluation | | ⊙ | X | X | ▲ | ⊙ | ⊙ | ○ | ▲ |

The thickness of the polymer-filled layer corresponds to the total thickness of the first electrode active material layer, the separator, and the second electrode active material layer, which are filled with the polymer electrolyte and continuous in the thickness direction The secondary battery of the present disclosure can be used in devices that are required to have super-slimness, bendability, and flexibility by taking advantage of the features of the battery. The secondary battery of the present disclosure can be used in the electric, information, and communication fields in which mobile devices and the like are used (for example, smart watches, activity meters, arm computers, and electronic paper), smart cards, the medical and healthcare fields (patch sensors and the like), and the IoT field, although these are merely examples.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium polymer battery comprising:
a laminate film including a metal foil, the laminate film being as an exterior material;
a first electrode including the metal foil and a first electrode active material layer provided on the metal foil;
a second electrode including a second electrode current collector and a second electrode active material layer provided on the second electrode current collector, and
a polymer electrolyte provided at an interface between the metal foil and the first electrode active material layer, wherein a coverage of the interface with the polymer electrolyte is 99% or more, and
the first electrode sandwiches the second electrode with a separator interposed between the first electrode and the second electrode.

2. The lithium polymer battery according to claim 1, wherein the interface between the metal foil and the first electrode active material layer is filled with the polymer electrolyte without a void.

3. The lithium polymer battery according to claim 1, wherein the first electrode active material layer is directly provided on the metal foil.

4. The lithium polymer battery according to claim 1, wherein the metal foil in the laminate film is configured to function as a current collector of the first electrode.

5. The lithium polymer battery according to claim 1, wherein the laminate film includes a resin layer on a surface of the metal foil opposite to a first electrode active material layer-formed surface of the metal foil.

6. The lithium polymer battery according to claim 1, wherein the polymer electrolyte filled in a void part from the first electrode active material layer to the second electrode active material layer is continuously connected and integrated.

7. The lithium polymer battery according to claim 1, wherein the exterior material includes one piece of the laminate film that is folded back.

8. The lithium polymer battery according to claim 7, wherein the first electrode active material layer is continuously provided on the metal foil in the one piece of laminate film, and the one piece of laminate film is folded back with a first electrode active material layer-formed surface of the metal foil being placed inside so that the first electrode that is folded back and includes the first electrode active material layer that sandwiches the second electrode with the separator interposed between the first electrode and the second electrode.

9. The lithium polymer battery according to claim 7,
wherein the first electrode active material layer is further divided into two layers including one first electrode active material layer and a different first electrode active material layer, and the first electrode active material layer is formed on the metal foil in the one piece of laminate film, and
the one piece of laminate film is folded back with a first electrode active material layer- formed surface of the metal foil being placed inside so that the one first electrode active material layer and the different first electrode active material layer sandwich the second electrode with a separator interposed between the one and different first electrodes and the second electrode.

10. The lithium polymer battery according to claim 9, wherein an inside of a folded-back part of the one piece of laminate film is filled with the polymer electrolyte.

11. The lithium polymer battery according to claim 9,
wherein an inside of a folded-back part of the one piece of laminate film is filled with the separator, and
the separator filled in the folded-back part is filed with the polymer electrolyte.

12. The lithium polymer battery according to claim 1, wherein the exterior material includes two pieces of laminate films independent from each other.

13. The lithium polymer battery according to claim 12,
wherein first electrode active material layers are respectively provided on metal foils in the two pieces of laminate films, and
the two pieces of laminate films are arranged with first electrode active material layer-formed surfaces of the metal foils being placed inside so that one first electrode including one of the first electrode active material layers in one of the laminate films and a different first electrode including the other one of the first electrode active material layers in the other one of the laminate films sandwich the second electrode with a separator interposed between the one and different first electrodes and the second electrode.

14. The lithium polymer battery according to claim 1,
wherein the lithium polymer battery has a thickness of 1 mm or less, and
the first electrode active material layer, the separator, and the second electrode active material layer that are continuously arranged have a total thickness of 50 µm or more.

15. The lithium polymer battery according to claim 1, wherein the metal foil includes a stainless steel foil or a nickel foil.

16. A method for producing a lithium polymer battery, the method comprising:
enclosing, by an exterior material that includes a laminate film including a metal foil, and that has a first electrode including the metal foil and a first electrode active material layer formed on the metal foil,
a second electrode including a second electrode current collector and a second electrode active material layer provided on the second electrode current collector, and
a monomer electrolyte including a monomer; and
polymerizing the monomer to provide a polymer electrolyte,
wherein the polymer electrolyte is provided at an interface between the metal foil and the first electrode active material layer,
wherein a coverage of the interface with the polymer electrolyte is 99% or more, and
wherein a separator is provided between the first electrode and the second electrode.

* * * * *